United States Patent [19]
Reich

[11] 3,918,911
[45] Nov. 11, 1975

[54] METHOD AND APPARATUS FOR PREPARATION OF LIQUID SAMPLES

[75] Inventor: Andrew Reich, Versailles, France

[73] Assignee: Intertechnique S.A., Plaisir, France

[22] Filed: Sept. 28, 1971

[21] Appl. No.: 184,373

[30] Foreign Application Priority Data
Oct. 9, 1970 France .................... 70.36644

[52] U.S. Cl. .......................................... 23/253 PC
[51] Int. Cl. ................................... G01n 31/12
[58] Field of Search ............ 23/230 PC, 253 PC

[56] References Cited
UNITED STATES PATENTS

| | | | |
|---|---|---|---|
| 3,148,032 | 9/1964 | Bennet et al. .................. | 23/230 PC |
| 3,428,432 | 2/1969 | Staunton et al. ............ | 23/230 PC X |
| 3,682,598 | 8/1972 | Kaartinen ...................... | 23/253 PC |

OTHER PUBLICATIONS
Peterson et al., Anal. Biochem. 31, 189(1969).

*Primary Examiner*—Robert M. Reese
*Attorney, Agent, or Firm*—Lane, Aitken, Dunner & Ziems

[57] ABSTRACT

Liquid samples for liquid scintillation counting are prepared by catalytic combustion of successive radioactive samples, continuous withdrawal of the combustion products which flow along a water extraction column and a $CO_2$ extraction column arranged in cascade. In each column there is a countercurrent flow of a selective solvent scintillation solution and of the gaseous combustion products which are intimately mixed by a rotating serrated paddle.

15 Claims, 5 Drawing Figures

INVENTOR
ANDREW REICH

BY
ATTORNEYS

METHOD AND APPARATUS FOR PREPARATION OF LIQUID SAMPLES

BACKGROUND OF THE INVENTION

The present invention relates to preparation of liquid scintillation samples, using complete oxidation and selective retention of some of the combustion products and is particularly useful in the preparation of liquid samples to be introduced into a liquid scintillation spectrometer which measures the radioactivity of these solutions. In order to avoid any ambiguity while retaining a terminology close to that which is commonly used in the art, the words "starting samples" will be used hereinafter to designate the samples which are subjected to oxidation and the terms "liquid samples" will designate those resulting from processing of the starting samples.

Liquid scintillation spectrometry constitutes a method which is now widely employed in medicine and in biology, since it provides a simple and convenient method of determination of the amount of beta emitters (tritium and carbon-14 in particular) and sometimes of alpha and gamma emitters of low energy contained in liquid samples. As a counterpart, the compounds to be studied must first be put in liquid phase. In some cases, it is possible to do this simply by means of a liquid solvent for the compound to be studied. In many other cases, it is necessary to pass through a combustion stage which transforms the tritium-labelled hydrogen into tritiated water and the carbon into carbon dioxide. The water is extracted and the carbon dioxide is retained by a suitable solvent.

It has become apparent for a long time that the method which is of greatest interest when it is necessary to treat a large number of samples successively is open combustion in a "train": numerous documents describe combustion methods and devices and reference can be made in particular to the article by M. A. Tamers and M. Diez entitled "Determination of C 14 and tritium in blood and other biological materials" (International Journal of Applied Radiation and Isotopes, 1964, vol. 15 P. 697–702).

None of the open combustion devices which have been constructed or proposed up to the present time, however, is wholly satisfactory. In a first type of open devices, the successive samples are burnt in a flame and tritiated water is collected by cooling the combustion products. All units of that type have a common drawback: continuous attention by an operator and manual adjustment of the flame are necessary. Operation of the existing devices is not truly continuous and cannot be rendered fully automatic. Flame combustion apparatuses of the prior art which are presented as having continuous operation in fact operate by discrete steps: the combustion products are progressively stored in an exchange column until oxidation of the starting sample is complete, before the liquid samples are prepared, thereby resulting in a large number of manual operations of valves in a sequence which is absolutely imperative, any error being liable to result in the loss of the sample being treated. Those apparatuses which are provided in serial arrangement from the oxidizing furnace with a water-condensing column followed by a column for collecting carbon dioxide are provided between the furnace and the first column with a non-heated zone which absorbs the products derived from the furnace, thereby making it necessary to rinse the system with a neutral gas several times between two samples in order to prevent a "memory" effect when a low-activity starting sample follows a highly active sample.

Another open combustion system, which is described in a paper by John I. Peterson et al. in "Analytical Biochemistry" 31 (1969) Pp. 189–210, makes use of catalytic combustion. Memory effect due to tritiated water condensation in the piping between the combustion furnace and the condenser is avoided by locating the condenser in line with the furnace. But the apparatus is cumbersome, and collection of 14C-labelled $CO_2$ makes it necessary to replace the condenser with a long tube provided with an inner twisted spinner. As a consequence, the apparatus cannot be considered as wholly satisfactory when double-labelled samples are to be processed.

SUMMARY OF THE INVENTION

It is an object of the invention to provide a catalytic combustion device and method, which improve upon the prior art techniques particularly in that operation may be wholly continuous, no permanent monitoring by an operator is necessary; samples which are single labelled, double labelled with 3H and 14C or mixed may be processed, and memory effects are minimized.

For this purpose there is provided an apparatus for the preparation of liquid samples, comprising a vertical combustion furnace, a bed of combustion catalyst in said furnace, means for dropping successive samples on said catalyst bed through a closable passage at the top of said furnace, means for introducing a predetermined flow rate of oxygen into said furnace above said bed, outlet means connected to said furnace under said bed for continuously withdrawing combustion gas during the combustion of each sample and for directing said gas to a water collection column and a $CO_2$ collection column each provided with means for progressively feeding a respective selective solvent into the column for intimately mixing the solvent and gas and for withdrawing the resulting liquid sample from the column.

BRIEF DESCRIPTION OF THE DRAWINGS

The invention will be more readily understood from the following description of an embodiment of the invention which is given by way of non-limitative example. The description refers to the accompanying drawings, in which.

DESCRIPTION OF THE PREFERRED EMBODIMENTS

Figure 1:
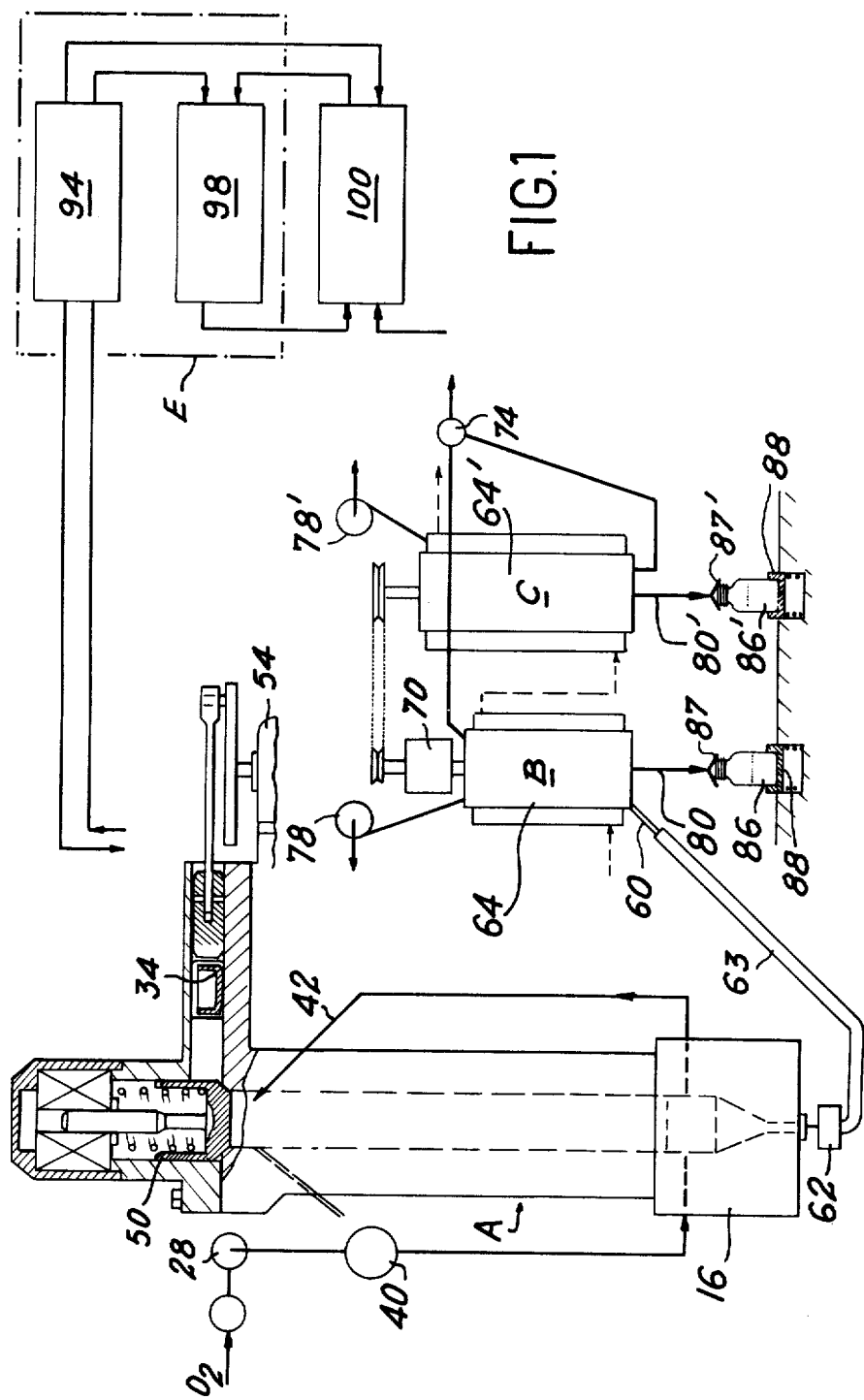
FIG. 1 is an overall diagrammatic view of the device.

Referring to FIG. 1, there is shown diagrammatically a device for preparing liquid samples containing C14 and/or H3 from starting samples which contain carbon labelled with C 14 and/or hydrogen labelled with tritium. The starting samples are, for example, biological or vegetable tissues. Each sample must be treated in order to oxidize the carbon into carbon dioxide gas and to retain it in a liquid sample and in order to transform the tritium-labelled hydrogen which it contains into tritium-containing water and to retain it in another liquid sample. The device described can evidently be completed so as to retain other elements which are labelled with a radioactive radioisotope (such as sulphur-35 for sulphur). Since the device which is illustrated in FIG. 1 provides from each starting sample two liquid samples one of which contains carbon and the other of which contains hydrogen, the H3 and C14 activities of each starting sample are determined more easily than when the liquid samples obtained are double-labelled.

The device illustrated in FIG. 1 may be considered as comprising a number of interrelated sub-assemblies or units which will be described successively. Some of the units can be replaced by others which may or may not be conventional without thereby departing from the scope of the invention. Moreover, as has been indicated earlier, additional components can be provided, for example in order to recover the sulphur or the phosphorus instead of allowing them to escape to atmosphere.

The device may be regarded as comprising a vertical furnace A, an apparatus B for retaining hydrogen in the form of a water-solvent mixture, an apparatus C for retaining carbon dioxide gas in the form of a solution. It may also include a conveyor for conveying the liquid samples towards a liquid scintillation spectrometer and an electronic circuit E for data processing and control.

The furnace A (FIGS. 1 and 2) comprises an internal tube 10 of quartz of "pyrex" glass which receives a body 12 of oxidation catalyst. An appropriate catalyst is the copper-manganese mixed oxide which is known by the trade name "hopcalite". Copper oxide catalysts may also be used. The tube 10 is retained between an upper flanged fitting 14 into which oxygen is admitted and a lower flanged fitting 16 for the discharge of combustion gases. Sealing gaskets 18, for instance of graphited asbestos, are interposed between the fittings and the tube 10 for providing an air-tight connection. Threaded rods 19 located around the tube exert a clamping force the fittings.

The fittings 14 and 16 have a diameter which is larger than that of the quartz tube 10 and retain an intermediate protection tube 22 of porcelain and a heating sleeve 24 which contains an electric resistor (not shown). Asbestos insulating washers 29 are located between the fittings and sleeve. The temperature of the quartz tube is measured at two levels by thermocouples 26. Other thermocouples 30 give the temperature of the input and output fittings 14 and 16.

The flat horizontal upper face of the flange component 14 is polished and formed with an axial passage 32 for the introduction of starting samples. The solid, pasty, slurry or liquid samples are enclosed within capsules 34 (FIG. 2) of combustible material. They are brought into position successively by a sample-loading unit which will be described hereinafter. The upper flanged fitting 14 is formed with ducts for injecting oxygen which ensures combustion. This oxygen is supplied from a source (not shown) under pressure (1.05 bar, for example), and is admitted through a solenoid operated valve 28 and flow regulator 40. The flow rate is constant so that the volume of oxygen admitted into the furnace may be determined simply by measuring the time of passage.

Figure 2:
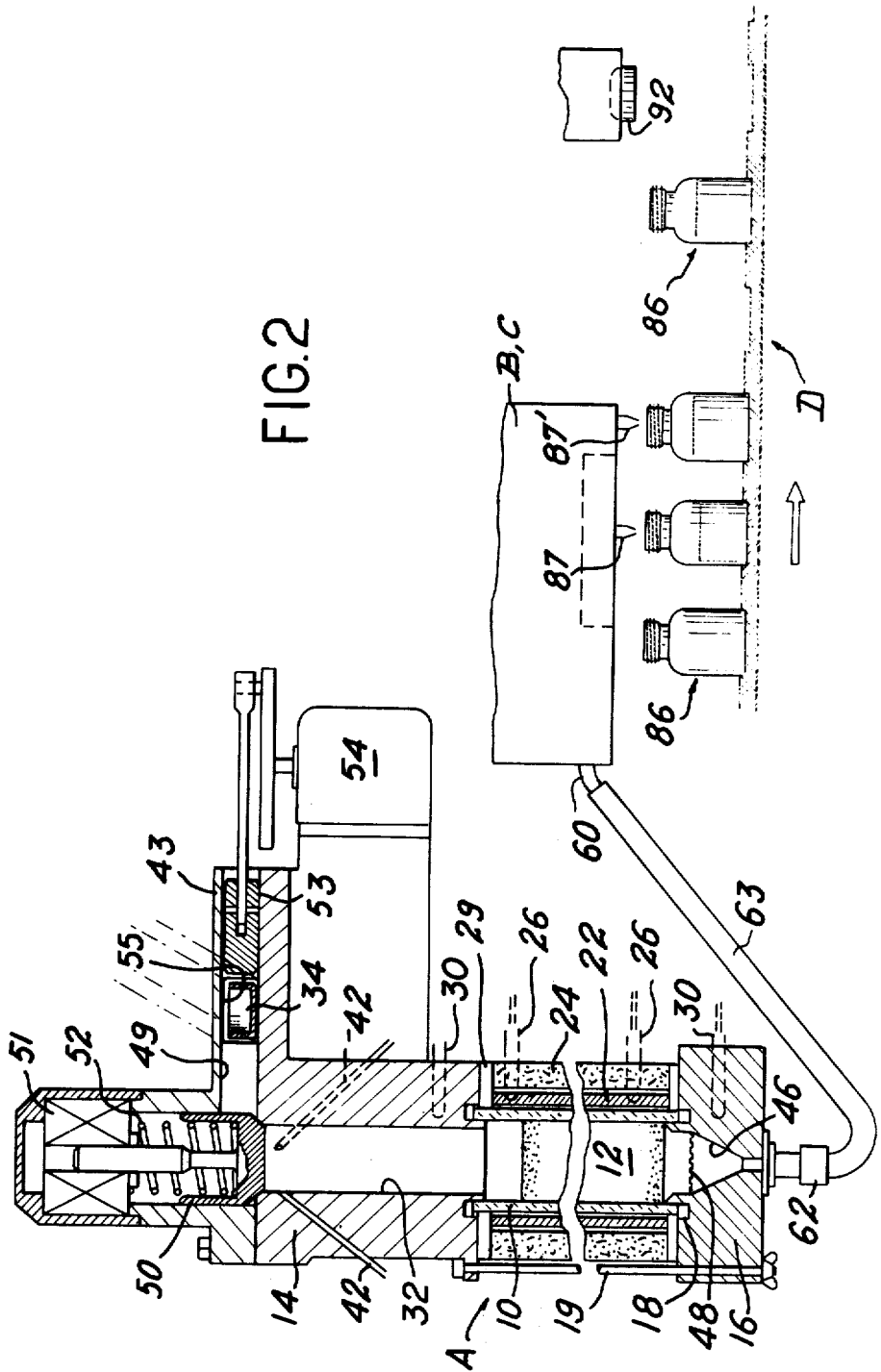
FIG. 2 shows in elevation and in partial cross-section the furnace of FIG. 1, and the furnace loading unit and a conveyor for transferring liquid samples to the spectrometer.

As shown in FIG. 2, three ducts 42 are formed in the fitting 14, are uniformly spaced about the axis and are directed upwards each towards a point of the base of the cup 34 which is offset relative to the axis. Thus, the admission of oxygen jets through the ducts 42 tends to produce a vortex flow having high turbulence.

The lower flange component 16 has an axial convergent passageway 46 through which the combustion gases flow out. A stainless steel screen 48 is located in the passageway and retains the catalyst.

The structural design of the furnace A permits ready dismantling, for instance for replacement of the catalyst. The catalyst itself is regenerated by re-oxidation, but it progressively collects ashes (particularly mineral ashes) which make periodical replacement necessary. For replacement, the rods 19 are removed, the lower fitting is moved downwards and the quartz tube is removed together with the catalyst which it contains.

During operation a temperature-regulating system maintains the catalyst at a suitable temperature (about 600°C if the catalyst is hopcalite) and maintains the flanged fittings at a temperature (about 200°C) which is lower, but above 100°C; heating of the lower fitting which is traversed by the oxygen admission duct makes it possible to pre-heat oxygen prior to introduction into the furnace and prevents condensation of water and contamination by "memeory" effect.

The loading unit which delivers successive starting samples is illustrated in FIGS. 1 and 2. It comprises a horizontal passageway 43 formed radially to the furnace and which opens into a vertical inlet passage formed in the fitting via a radial opening 49. Said passage in the fitting is provided below the opening 49 with a seat which can be closed by a valve 50 which is controlled by a electromagnetic coil 51. The valve is biased toward its seat by a spring 52 which is so adjusted that the valve lifts in the event of accidental and excessive overpressure within the furnace (for instance if the pressure exceeds atmospheric pressure by 1 kg/cm$^2$).

The cups 34 can be placed on a removable tray (not illustrated) placed opposite to a lateral opening 55 of the passageway and introduced manually each at a time. Alternately, there may be provided a spring for introducing a cup 34 into the passageway. A piston is placed within the passageway and a mechanism actuated by a motor 54 displaces the piston between a withdrawn position (illustrated in FIGS. 1 and 2) in which it is located behind the opening 55 and a forward position in which it separates the furnace from the opening 55 and moves the cup above the seat. Synchronization means ensure that the coil 51 is energized before the motor 54 of the piston. A safety circuit (not shown) delays movement of the piston until after the valve is lifted in order to prevent a cup from being crushed between piston 53 and valve member 50.

A pipe which communicates with the collection unit is connected in leak-tight manner to the outlet of end fitting 16. Pipe 60 is associated with a non-return check valve 62 and with heating means 63 (line-cord of electric resistors, for example) which maintain the pipe at a temperature sufficient to prevent it from retaining water or other combustion products. A thermocouple detects the temperature and controls the heater elements so as to maintain a sufficient temperature, 200°C for example.

When the device is intended for use with a process computer, a sensor for determination of the beginning and end of combustion of each sample and consequently the weight of the latter may be located between end fitting 16 and pipe 60. The sensor can consist of a thermal conductivity detector comprising a transducer and the associated electronic circuitry such as the detector sold by Gow-Mac Instruments. The instrument operates on the following principle: the heat transfer coefficients of the oxidation products which represent the greater part of the combustion gases ($NO_2$, $CO_2$, $H_2O$) are substantially the same and are very different from that of oxygen. The arrival of the combustion gases will therefore be detected by an abrupt change in the heat transfer coefficient and the end of combustion will cause a variation in the opposite direction. The signals representing the beginning and end of combustion indicate the combustion time from which it is possible to deduce the weight of the sample if the flow rate of oxygen has been maintained at a constant value.

The incorporation of a system of this type is of particular interest when the device is associated with a liquid scintillation spectrometer equipped with a computer (for example an SL 40 spectrometer of the company known as Intertechnique S.A. with in-line computer or an SL 30 spectrometer of the same company associated with a "multi-8" digital computer). In fact, detection of the beginning and end of oxidation on the one hand supplies data to the computer and on the other hand controls the changeover from one operation to the next in the operating sequence. However, it is wholly apparent that the device may not comprise a system of this type, in which case each start sample must be weighed.

Figure 3:
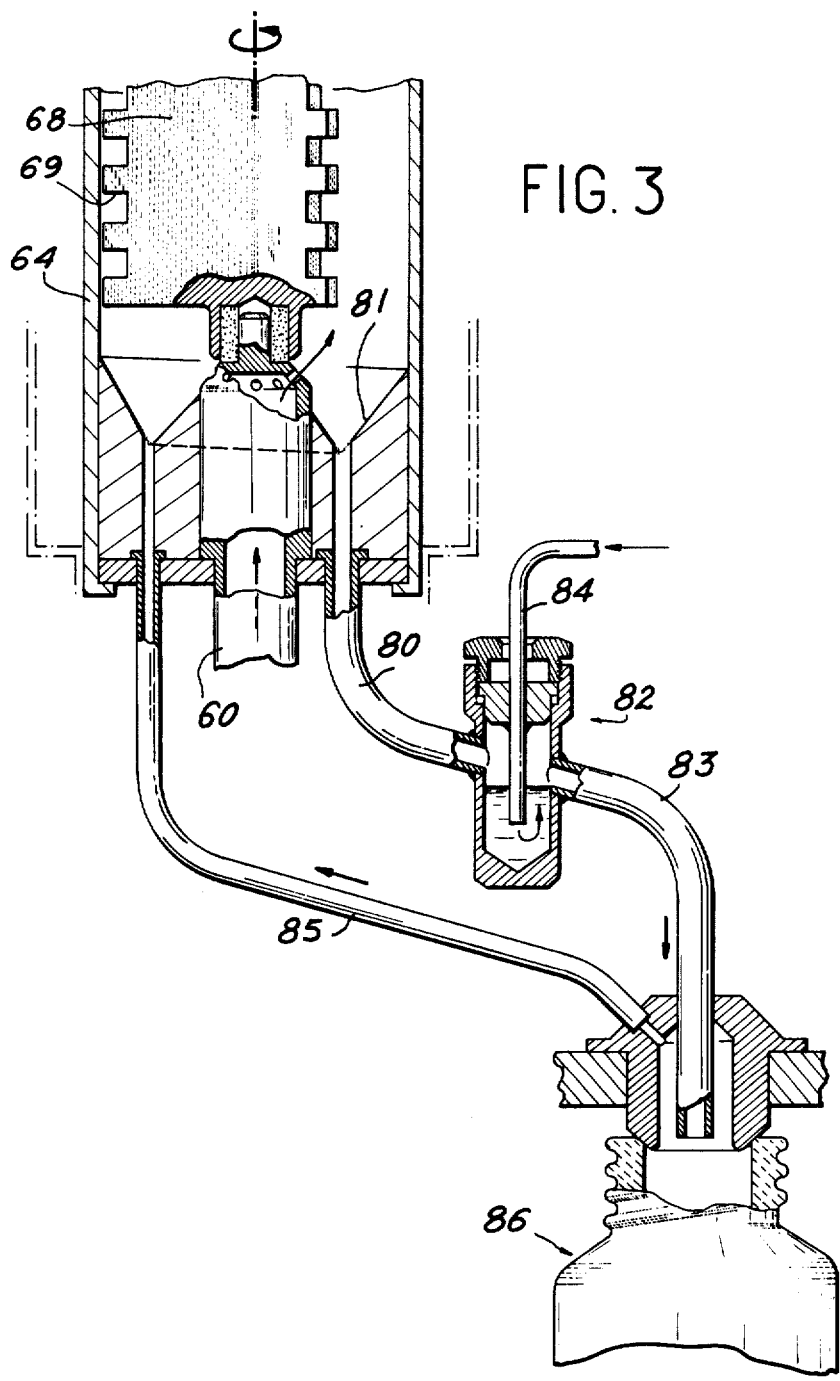
FIG. 3 is a sectional elevation view of the lower portion of the water-collection unit of FIG. 1.
Figure 4:
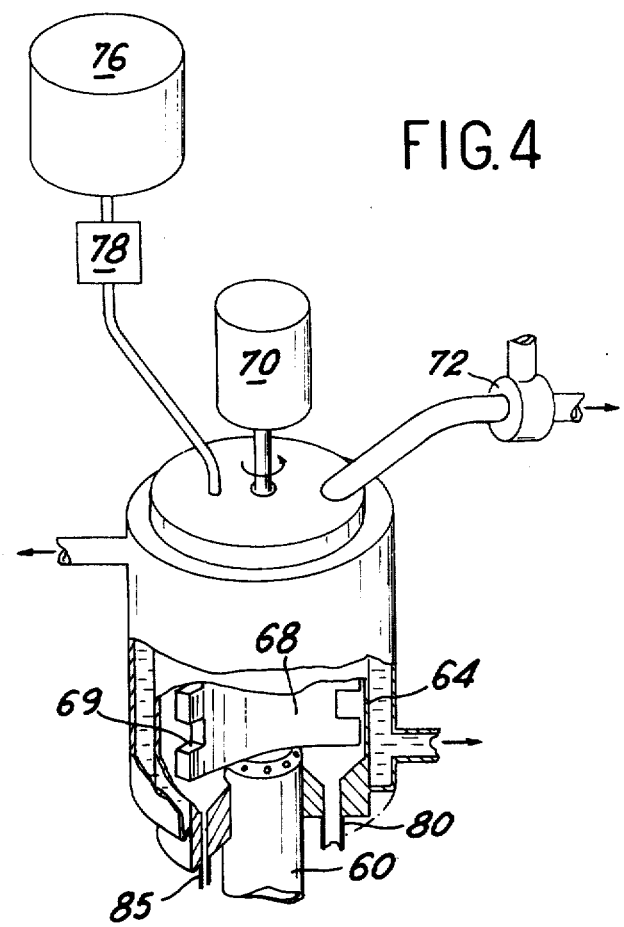
FIG. 4 shows diagrammatically in elevation with portions broken away the complete water-collection unit of FIG. 1.

The units for retaining tritiated water and carbon dioxide gas as indicated diagrammatically by the references B and C in FIG. 1 are very similar. Referring to FIGS. 3 and 4, the water-retaining unit B comprises a vertical cylindrical vessel 64 in which is mounted a rotating paddle or "spinner" 68 driven by a motor 70. The sprinner may have a star-shaped cross section and the outer edge of each arm is formed with notches 69 (for instance 5 mm long and 5 mm deep). The clearance is small (0.1 mm for instance), and the paddle creates a discontinuous, highly turbulent liquid ring in the column cylinder. The heated pipe 60 is connected to the base of the vessel 64 and supplies combustion gas to the latter. A gas-outlet 72 is connected to the upper end of the vessel 64 and opens into the end bottom wall of unit C. A selector valve 74 located on outlet 72 makes it possible to connect the outlet of vessel 64 directly to atmosphere when it is not necessary to retain $CO_2$.

A circuit for the delivery of solvent opens into vessel 64 close the axis of rotation of the spinner 68 and above the spinner. This circuit comprises a reservoir 76 (FIG. 4) and a metering pump 78 which injects the volume of solvent necessary for each sample. The scintillator material may be contained in the solvent received within reservoir 76. A mixture of toluene and absolute alcohol (the function of which is to retain water) may be used. A solvent of this type, for example containing 30% by weight of alcohol and 70% by weight of toluene, can readily be stored in neutral and dry atmosphere.

The bottom wall of collection unit B is provided with a water outlet illustrated in FIG. 3. The outlet comprises a pipe 80 which connects a circular groove 81 in the upper face of the bottom wall with the upper portion of a small volume bubbler 82; liquid in excess overflows to an outlet tip 83. Nitrogen is continuously delivered to the liquid by a small section line 84 which opens near the bottom of the bubbler: as a result, there is an exchange between the oxygen contained in the sample and nitrogen. Excess gas flows back to the collection unit via a small diameter line 85 connected to a plug on which the water-receiving vial bears during collection. Effective removal of dissolved oxygen may be secured in this way and the amount of quenching is substantially lessened. Unit B is provided with a jacket-cooled by a flow of liquid (such as glycol) (arrows in dot-lines on FIG. 1), whereby retention of water by the alcohol is rendered more effective.

The carbon-dioxide collection unit C is similar in structural design to that wich has just been described but the solvent which is fed to the apparatus is different; a suitable mixture comprises 80% of toluene and 20% of phenylethylamine and contains the scintillator product. The pipe 72 for the discharge of gases from the vessel opens freely to the atmosphere in most cases, since only carbon and hydrogen are to be retained.

The $CO_2$ collection unit C has a greater length in order to account for the lower efficiency of the trapping action of the solvents. As a consequence, the same motor may be used for driving the paddles of units B and C: motor 70 is coupled with the paddle of unit B through an overload coupling and with the paddle of unit C through pulleys and a drive belt. On FIG. 1, the cooling systems of the two units are serially mounted as indicated by the arrows, but two independant systems may be used.

In the embodiment of FIGS. 1 and 3, the vials which receive the liquid samples are retained in sealing abutment against the respective outlet plugs 87 and 87' by spring loaded seats 88 and they are manually located and removed. This arrangement may be replaced with a conveyor of the type illustrated in FIG. 2. The conveyor D of FIG. 2 is moved by a drive mechanism (not shown) which displaces it by steps equal to twice the interval which separates the two nozzles 80 and 80'. There are provided in this conveyor recesses for receiving vials 86 of conventional design. When the conveyor is at rest, sample recesses are located opposite the plugs 87 and 87'.

Once it has been displaced by one step from the oxygen-removal device, each vial 86 may come in front of a conventional device which closes it off by means of a stopper 92 and provides it with an identification mark.

Figure 5:
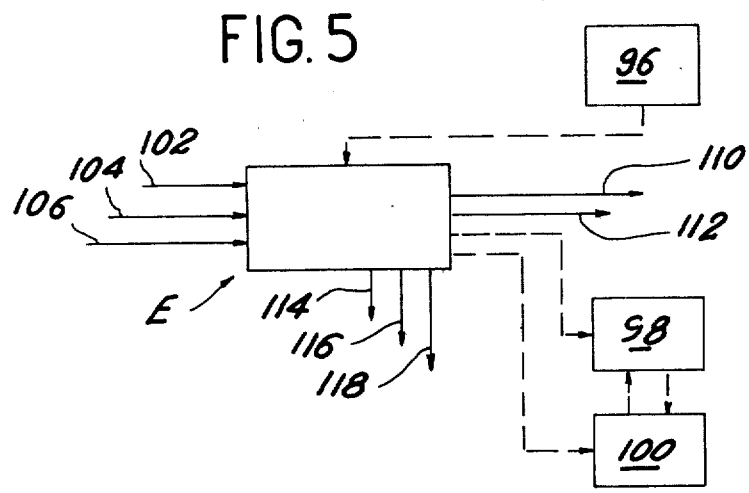
FIG. 5 is a simplified block diagram of the electronic circuitry.

The operation of the device may be controlled by an electronic circuit the simplified block diagram of which is given in FIG. 5. This electronic circuit comprises a sequence control unit 94 which is provided with manual means for setting the operating conditions and which controls the sequential performance of operations. There is associated with this logic and control unit a clock generator 96 which delivers time pulses at a suitable frequency. This clock makes it possible to determine the mass of each sample by measuring the time of passage of the combustion gases, the presence of which is detected by the thermal conduction measuring cell. There is also provided a data recorder which can be a printed or a punched-tape or magnetic tape recorder. If the device is coupled with a liquid-scintillation spectrometer, the control unit 94 may be connected to a suitable interface which is dependent on the electronic circuit of the spectrometer. Moreover, there can be a direct exchange of information between this interface and the recorder 98.

As indicated above, the sequencer 94 receives data and signals corresponding to the end of each stage of the intended sequence. It also supplies data to the recorder and if necessary to the interface and delivers control orders to different components of the device. For greater clarity, the junctions corresponding to transmission of data are indicated in broken lines in FIG. 5 whilst the junctions corresponding to the control of elements are indicated in full lines.

The control unit 94 receives at its input 102, 104 and 106 information which is derived respectively from the cell for measuring the coefficient of heat transfer, thermocouples 26, 30 and 63 and from the sample-loader. Other inputs (not shown) of the control unit receive information which cause operation to stop when causes of error or failure exist and are detected, such as insufficient filling of reagent vessels, excessive temperature drop within the furnace or within the connecting pipes, loss of coolant, faulty operation of one of the components, absence of reception vials, etc... On the basis of information received, the control and measuring unit elaborates the data to be recorded which are essentially the correspondence between the output samples and the input samples and the weight of the input samples. The same data can be transmitted to the interface of the associated liquid scintillation spectrometer.

The logic unit comprises outputs 110, 112, 114, 116 and 118 derived, for example, from a sequence generator which is incorporated therewith, and intended to control and/or maintain in operation the stopper-fitting mechanism, the conveyor D, the oxygen-supply solenoid operated valve, the motor for rotating the spinners 68 and the metering pumps 78 and 78'.

The operation of the device is obvious from the foregoing description and will therefore be explained only in brief outline. The necessary temperature (for example 600°C for the catalyst, 200°C for the lower end fitting of the furnace A and the pipe 60) being attained and maintained, the following sequence takes place: the control unit 94 emits at its output 116 a signal which operates the motor 54 and energizes the actuating coil 51. When the valve 50 is lifted of its seat, it closes a microswitch (not shown) located in the motor supply circuit: thus, motor 54 can be put into operation only after effective lifting of the valve 50. The motor control circuit is of a type which produces only one complete revolution: during the corresponding back-and-forth movement of the piston 53, a cup is brought above the seat and falls into the furnace. Back movement of the piston de-energizes coil 51 and valve 50 closes again.

The stream of oxygen which is preheated by flowing within the end fitting 16 assists the capsule 34 in falling onto the catalyst bed. As soon as combustion gases pass through the detection cell, a signal is passed to the input 102 of the control unit 94 which records the pulses derived from the clock generator 96. At the same time, the control unit 94 starts-up the metering pumps 78 and 78' which will deliver a predetermined mass of solvent into the vessels 64 and 64'. The flow rate is chosen for the flow time to be much longer than the time of passage of the combustion gases: capture of water or carbon dioxide gas is followed by rinsing of the vessels which eliminates memory effects. A further signal derived from the detection cell results in stopping of the time recording by the logic unit which provides an indication of mass to the recorder 98 and if necessary to the interface 100. The oxygen flow is stopped on expiry of a predetermined time interval after the end of combustion which is detected by the flow of practically pure oxygen at the outlet of the furnace A. The control unit then emits on output 112 a stepping-motion signal which causes the conveyor D (if provided) to move over a predetermined distance. The location of the stoppering device actuated by the output 112 can be such that it closes the vial which has been filled.

The operation of a device of this type is fully automatic: the operator only needs to select the main parameters and to provide the necessary supplies, whereupon all operations are carried out automatically. Moreover, a device of this type is wholly suited to complete coupling with a liquid-scintillation spectrometer which provides automatic operation.

It must be noted that each liquid sample supplied to the associated liquid-scintillation spectrometer contains only carbon or hydrogen. This fractionation is of advantage: on the one hand, it permits of much more accurate determination of the tritium activity of double-labelled starting samples in view of the fact that it is no longer necessary to effect a correction corresponding to the contribution of carbon within the channel in which the tritium activity is measured. The almost complete absence of quenching agent (with the exception of alcohol in liquid samples which contain water) also results in a higher degree of accuracy and better counting efficiency.

I claim:

1. An apparatus for the preparation of liquid samples, comprising a vertical combustion furnace, a bed of combustion catalyst in said furnace, means for dropping successive samples on said catalyst bed through a closable passage at the top of said furnace, means for introducing a predetermined flow rate of oxygen into said furnace above said bed, first gas outlet means in said furnace under said bed from which combustion gas can be continuously withdrawn during the combustion of a sample, a water collection column located in series relation along the path of the gas from the furnace, first gas inlet means in the water collection column connected to the first gas outlet means, solvent feeding means for continuously introducing a solvent into the water collection column above the first gas inlet means so that the gas and solvent will mix through countercurrent flow, second gas outlet means in the water collection column above the portion thereof where the gas and solvent are mixed and means through which a sample can be withdrawn located below said portion, a $CO_2$ collection column located in series relation along the path of the gas from the water collection column, second gas inlet means in the $CO_2$ collection column connected to the second gas outlet means, solvent feeding means for continuously introducing a solvent into the $CO_2$ collection column above the second gas inlet means so that the gas and solvent will mix through countercurrent flow, third gas outlet means in the $CO_2$ collection column above the portion thereof where the gas and solvent are mixed and means through which a sample can be withdrawn located below said portion.

2. Device according to claim 1, wherein each said column is provided with means for circulating a cooling fluid.

3. An apparatus according to claim 1, wherein each column comprises: a vertical cylinder, a paddle mounted in said cylinder for rotation about the axis of said cylinder, the lateral edges of said paddle being close to the wall of said cylinder and notched; motor means located out of said cylinder for driving said paddle; inlet and outlet means for said gas, inlet means for the admission of a liquid solvent and outlet means for the liquid sample, said inlet and outlet means being arranged for countercurrent circulations of the solvent and of the gas within the cylinder.

4. Device according to claim 3, wherein the solvent contains a scintillator.

5. Device according to claim 3, comprising a metering pump for progressively injecting a predetermined volume of solvent into each cylinder for a time period which begins immediately upon admission of the combustion gas from a sample into the cylinder and continues beyond completion of passage of said gas through the cylinder.

6. Device according to claim 3, having a sequence control unit for automatically controlling the sequence of necessary operations in response to introduction of a starting sample.

7. An apparatus for the preparation of liquid samples, having: a vertical combustion furnace; a bed of combustion catalyst in said furnace; means for introducing oxygen at a predetermined flow rate into said furnace above said bed; means for continuously withdrawing combustion gas from said furnace under said bed and directing it to cascaded means for selective solvent collection of water and $CO_2$; sample loading means comprising an upper end fitting for said furnace, a vertical passage formed in said fitting and communicating with said furnace, a radial passage formed in said fitting and opening into said vertical passage, a seat formed in said vertical passage between said radial passage and said furnace, a valve member movable between a normal position where it closes said seat and an open position where it clears said seat and the opening of said radial passage, means for introducing starting samples one at a time along said passage and means for forcibly opening said valve member in response to said introduction.

8. Apparatus according to claim 7 having means for detecting changes in the coefficient of heat transfer of gases at the outlet of the furnace, means for measuring the flow rate of said gases, and means for measuring the time duration between successive changes, whereby the weight of each radioactive sample may be determined.

9. Apparatus according to claim 7 comprising resilient means exerting a force on said valve member which biases it toward its seat against the pressure in said furnace.

10. Apparatus according to claim 7, having a solenoid for actuation of said valve member against a return spring which exerts a force on said valve member which biases it toward said seat.

11. Apparatus according to claim 7, having means for heating the withdrawed means which convey the gaseous combustion products to the water collection means to a temperature above 100°C.

12. Apparatus according to claim 7, wherein the furnace comprises a heating sleeve, a cylindrical tube located in said sleeve and clamped vertically between an upper end fitting in which the starting sample inlet is formed and a lower end fitting in which the outlet is formed.

13. Device according to claim 12, wherein said means for supplying oxygen into the furnace comprise a plurality of ducts formed obliquely in the upper end fitting and directed towards the valve.

14. An apparatus for the preparation of liquid samples, comprising a vertical combustion furnace, a bed of combustion catalyst in said furnace, means for dropping successive samples on said catalyst bed through a closable passage at the top of said furnace, means for introducing a predetermined flow rate of oxygen into said furnace above said bed, first gas outlet means in said furnace under said bed from which combustion gas can be continuously withdrawn during the combustion of a sample, a water collection column located in series relation along the path of the gas from the furnace, first gas inlet means in the water collection column connected to the first gas outlet means, solvent feeding means for continuously introducing a solvent into the water collection column above the first gas inlet means so that the gas and solvent will mix through countercurrent flow, second gas outlet means in the water collection column above the portion thereof where the gas and solvent are mixed and first means through which a liquid sample can be withdrawn located below said portion, a $CO_2$ collection column located in series relation along the path of the gas from the water collection column, second gas inlet means in the $CO_2$ collection column connected to the second gas outlet means, solvent feeding means for continuously introducing a solvent into the $CO_2$ collection column above the second gas inlet means so that the gas and solvent will mix through countercurrent flow, third gas outlet means in the $CO_2$ collection column above the portion thereof where the gas and solvent are mixed and second means through which a liquid sample can be withdrawn located below said portion, each of said first and second means through which a liquid sample can be withdrawn including an intermediary overflow chamber, means for bubbling a flow of neutral gas in the volume of liquid sample retained in said chamber, and means for returning vapour and gas to the column from which the liquid sample is withdrawn, said vapour and gas being returned from a zone of said outlet means located downstream of said chamber.

15. The apparatus in claim 14, wherein said neutral gas is nitrogen.

* * * * *